United States Patent
Tsai et al.

(10) Patent No.: US 7,346,314 B2
(45) Date of Patent: Mar. 18, 2008

(54) FORWARD LINK TRANSMIT POWER CONTROL BASED ON OBSERVED COMMAND RESPONSE

(75) Inventors: Shiau-He Shawn Tsai, San Diego, CA (US); Anthony C. K. Soong, Superior, CA (US); Young C. Yoon, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 975 days.

(21) Appl. No.: 10/768,560

(22) Filed: Jan. 30, 2004

(65) Prior Publication Data

US 2005/0037796 A1 Feb. 17, 2005

Related U.S. Application Data

(60) Provisional application No. 60/495,477, filed on Aug. 15, 2003.

(51) Int. Cl.
*H04B 1/00* (2006.01)
(52) U.S. Cl. .......................... 455/69; 455/522; 370/332
(58) Field of Classification Search .................. 455/69, 455/522, 13.4, 574, 115.3; 370/332, 498, 370/318, 337
See application file for complete search history.

(56) References Cited

U.S. PATENT DOCUMENTS

2001/0012785 A1 8/2001 Esteves et al.
2002/0111183 A1 8/2002 Lundby
2003/0054773 A1 3/2003 Vanghi
2004/0023699 A1* 2/2004 Zhou et al. .................. 455/574

FOREIGN PATENT DOCUMENTS

WO    WO 02/23764    3/2002

* cited by examiner

*Primary Examiner*—Tu Nguyen
(74) *Attorney, Agent, or Firm*—Coats & Bennett, P.L.L.C.

(57) ABSTRACT

A method and apparatus to provide a deterministic power control mechanism for the transmission of mobile station power control commands based on transmitting non-power control commands for which mobile stations exhibit deterministic, observable responses at related transmit powers, e.g., at the same power. For example, a wireless network base station may adjust the target used for sending power control commands to a given mobile station by observing whether that mobile station correctly responds to rate control or retransmit control commands sent at the same transmit power. The mobile station's response (or non-response) to such non-power control commands is readily observable and can be taken as an indication of whether the power target is sufficient for current radio conditions. Although not so limited, this approach may be particularly beneficial where non-power control commands are sent along with the power commands on a sub-channel of a common power control channel.

63 Claims, 5 Drawing Sheets

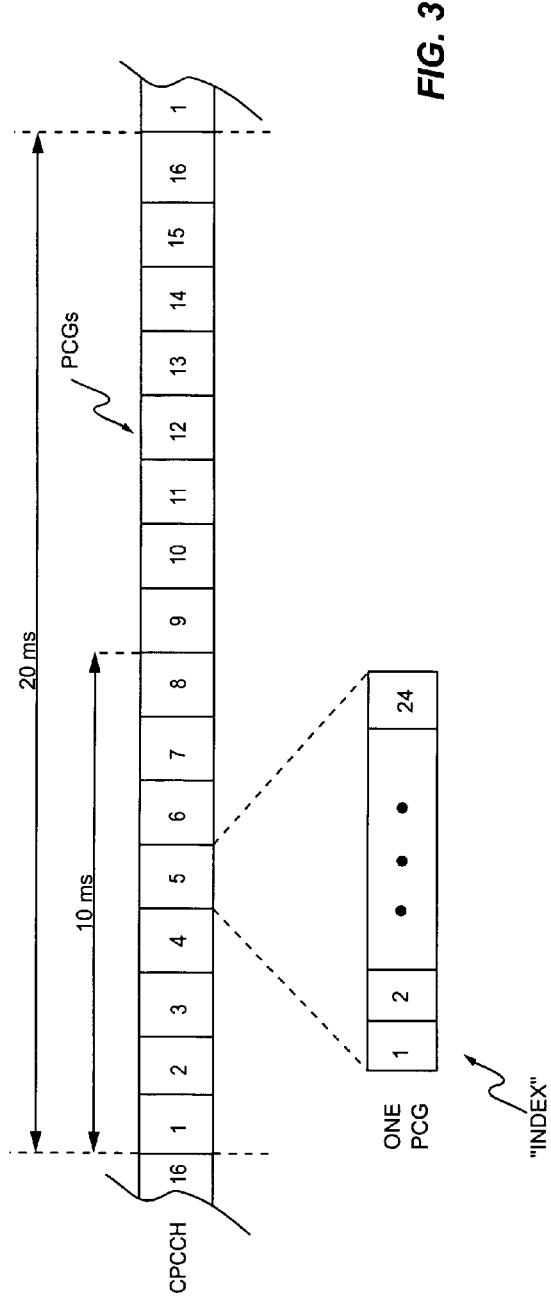
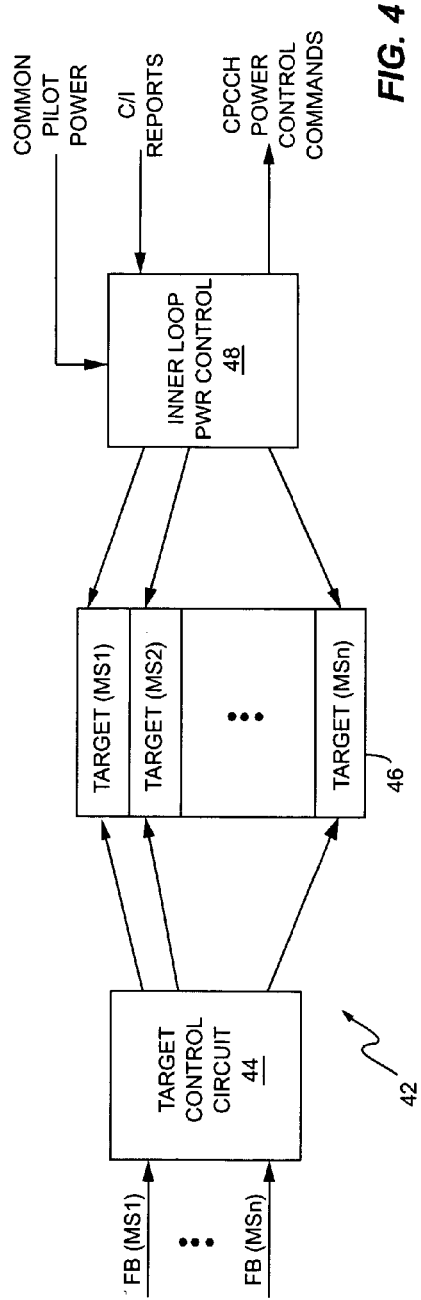
FIG. 3
FIG. 4

FORWARD LINK TRANSMIT POWER CONTROL BASED ON OBSERVED COMMAND RESPONSE

RELATED APPLICATIONS

This application claims priority under 35 U.S.C. § 119(e) from the following provisional application: Application Ser. No. 60/495,477 filed on Aug. 15, 2003. That application is incorporated in its entirety by reference herein.

BACKGROUND OF THE INVENTION

The present invention generally relates to wireless communication networks, and particularly relates to base station power control.

Wireless communication networks typically use one or more power control mechanisms on the forward and reverse links. For example, in Code Division Multiple Access (CDMA) networks, base stations transmit power control commands to each mobile station to control the reverse link interference contribution of each mobile station. Such control commonly includes both "inner" and "outer" control loops. The inner control loop for a given mobile station is driven by the signal strength or a related parameter of the mobile station's reverse link transmit signal received at one or more base stations. More particularly, a base station supporting the mobile station on the reverse link compares the received signal strength of the mobile station's signal to a corresponding target strength and transmits up or down power control commands to the mobile station depending on whether the received strength is above or below the target.

A typical outer loop control mechanism then adjusts the value of that target upward or downward depending on the Frame Error (or Erasure) Rate (FER) of traffic frames received from the mobile station. For example, if the FER is below one percent, the target is adjusted downward, and if the FER is above one percent, the target is adjusted upward. Typically, the outer loop control runs more slowly than the inner loop control. For example, in CDMA networks based on the IS-2000 standards, inner loop power control runs at 800 Hz and outer loop power control runs at 50 Hz or less.

Similar control mechanisms are used on the forward link for selected transmissions to the mobile stations. For example, the forward link transmit powers allocated to the traffic channels of the mobile stations are adjusted upward or downward based on power control commands returned to the base station by the mobile stations. However, certain signals transmitted by or to the network typically have no direct power control feedback available. For example, in CDMA networks using common power control channels to transmit power control bits to individual mobile stations in time multiplexed fashion, there may be no direct feedback from the mobile stations to indicate whether the power control bits are being sent at the appropriate power.

SUMMARY OF THE INVENTION

The present invention comprises a method and apparatus for power control in a wireless communication network. In one or more exemplary embodiments, the present invention comprises a method of controlling a transmit power of power control commands transmitted from a base station to a mobile station by transmitting power control commands to the mobile station at a first transmit power, transmitting non-power control commands to the mobile station at a second transmit power, and controlling the first transmit power based on determining whether the mobile station correctly responds to the non-power control commands.

Thus, an exemplary base station for use in a wireless communication network comprises transmitter circuits to transmit power control commands to a mobile station at a first transmit power, and to transmit non-power control commands to the mobile station at a second transmit power, and one or more processor circuits operatively associated with the transmitter circuits, and configured to control the first transmit power based on determining whether the mobile station correctly responds to the non-power control commands. Such processor circuits may comprise one or more microprocessors and/or Digital Signal Processors (DSPs).

The non-power control commands may comprise, for example, rate control commands where a logical rate control response by the mobile station is expected for each rate control command transmitted to it, or, similarly, retransmit control commands where a logical retransmit control response is expected. Such commands yield observable mobile station responses that indicate whether the mobile station correctly received the transmitted command. The non-power control commands are sent at the same power as the power control commands, or sent at one or more transmit powers that are otherwise related to the transmit power used for transmitting the power control commands. For example, the non-power control commands can be sent at one or more known power ratios, or sent at powers based on some other known relationship, such that the base station can infer the appropriate transmit power for reliable reception of the power control commands by the mobile station.

Thus, by way of non-limiting example, the base station may transmit rate control commands, retransmit control commands (e.g., ACK/NAK), or both, on sub-channels of a common power control channel used to stream power control commands to individual ones of a plurality of mobile stations. Determining whether a given mobile station correctly receives the power control commands sent to it is difficult, i.e., there is no mobile station response to received power control commands that is readily observable by the base station. However, the mobile station does exhibit readily observable deterministic responses to rate control and retransmit control commands, i.e., the mobile station changes its reverse link data rate in response to a correctly received rate control command, or retransmits a last data frame in response to a correctly received NAK.

If one or more of these types of non-power control commands are transmitted to the mobile station in a format that is comparable with that of the power control commands, then the base station can infer whether it should adjust the transmit power used for the power control commands upward or downward based on observing whether the mobile station correctly responds to the non-power control commands. For example, the non-power control commands can be sent at the same power as used for the power control commands, or at some known power ratio and in some comparable modulation format, such that the appropriate transmit power for power control commands can be inferred.

Thus, another exemplary base station comprises transceiver circuits configured to transmit signals to a plurality of mobile stations, including a common power control channel (CPCCH) signal, and to receive signals from the mobile stations, and processing logic operatively associated with the transceiver circuits and configured to transmit power control commands on the CPCCH signal to the mobile stations and to control a transmit power of the CPCCH signal for each mobile station based on a control target corresponding to the mobile station, and further configured to transmit non-power control commands to the mobile stations via the CPCCH. Exemplary processing logic includes a target adjustment circuit configured to adjust the targets used at the base station or at the respective mobile stations for CPCCH transmit power control based on observing the mobile stations' responses to the non-power control commands transmitted to them.

Of course, the present invention is not limited by the above descriptions. Those skilled in the art will recognize additional features and advantages of the present invention upon reading the following detailed description, and upon viewing the accompanying drawings.

BRIEF DESCRIPTION OF THE DRAWINGS

FIG. 3 is a diagram of exemplary CPCCH structures.

FIG. 4 is a diagram of exemplary target adjustment circuit details.

DETAILED DESCRIPTION OF THE INVENTION

Figure 1:
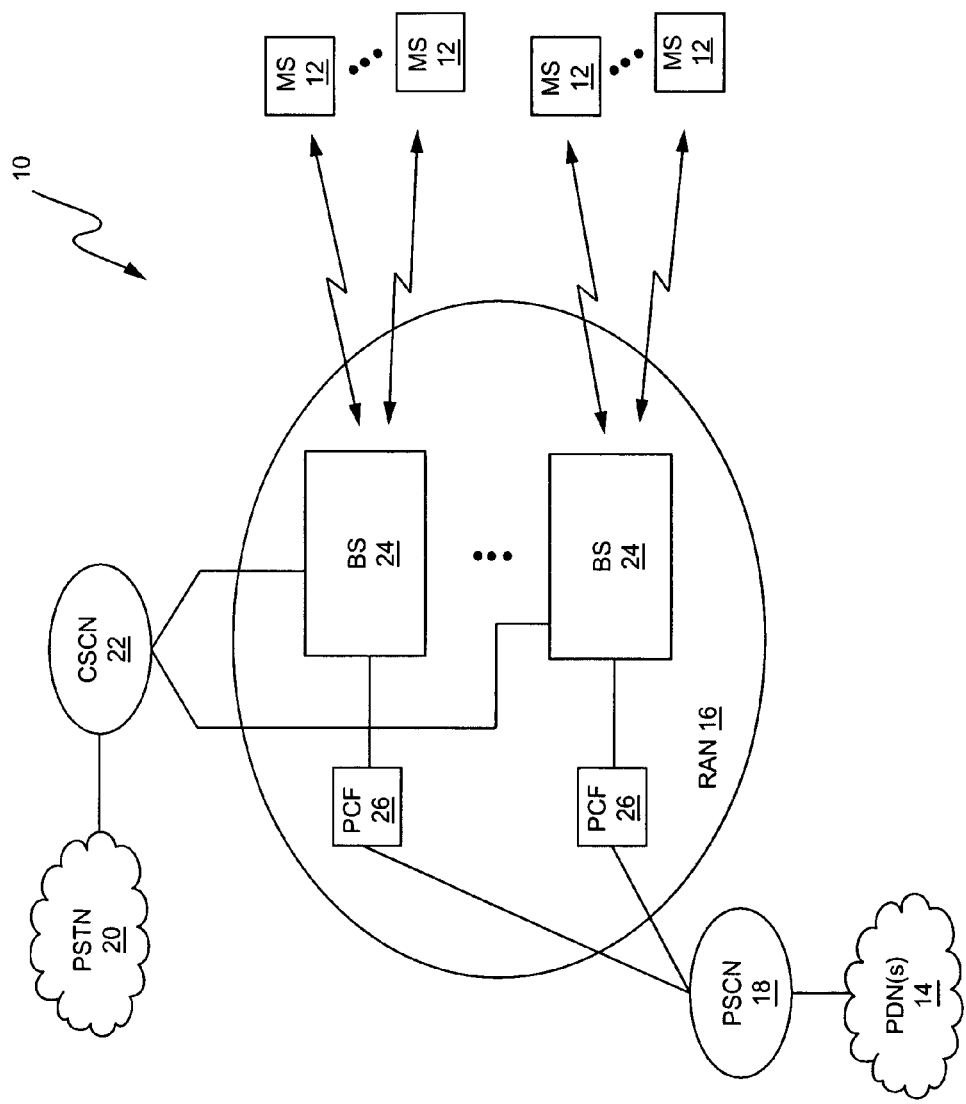
FIG. 1 is a diagram of an exemplary wireless communication network according to one or more embodiments of the present invention.

FIG. 1 illustrates an exemplary wireless communication network 10 according to one or more embodiments of the present invention. Wireless network 10 may be configured according to the IS-2000 family of standards but the present invention is not limited to such implementations. For example, network 10 may be configured according to Wideband CDMA (WCDMA) standards. Those skilled in the art will appreciate that the architectural details and entity arrangements/names might change according to the particular wireless network standard actually used, but such changes do not change the underlying operation and benefits of the present invention.

With that in mind, the illustrated network 10 communicatively couples one or more mobile stations 12 to one or more Public Data Networks (PDNs) 14, e.g., the Internet, via Radio Access Network (RAN) 16 and Packet Switched Core Network (PSCN) 18. Similarly, network 10 may couple at least some of the mobile stations 12 to the Public Switched Telephone Network (PSTN) 20—and other circuit-switched services—through RAN 16 and Circuit Switched Core Network (CSCN) 22. Those skilled in the art will appreciate that network 10 in actual implementation may include additional entities and additional complexity. For example, CSCN 22 may include one or more Mobile Switching Centers (MSCs), Home Location Registers (HLRs), Visitor Location Registers (VLRs), etc. Likewise, PSCN 18 may include gateway routers, authentication and accounting servers, and one or more Packet Data Serving Nodes (PDSN) for sending and receiving packet data to and from RAN 16.

In turn, RAN 16 may in implementation have additional complexity beyond that illustrated. As illustrated, RAN 16 comprises one or more Base Stations (BSs) 24, each supporting wireless communication with one or more mobile stations 12. Each BS 24 may be communicatively coupled to PSCN 18 through a Packet Control Function (PCF) 26, or like entity, that provides a Radio-Packet (RP) interface between the RAN 16 and the PSCN 18. In one or more exemplary embodiments, the PCFs 26 may be integrated with their respective BSs 24.

In any case, each BS 24 transmits forward link signals to one or more mobile stations 12, and receives reverse link signals from them. Some of these forward link signals may be "broadcast" or common signals used by a plurality of mobile stations, such as a forward link common pilot signal used by the mobile stations to generate channel quality feedback reports for transmission to network 10. Carrier-to-Interference (C/I) reports and the like are examples of such reports. Other forward link signals may be dedicated, per-mobile station signals, such as dedicated forward link traffic and control signals. Typical reverse link signals include access/origination messages sent on common, random-access channels, and traffic and control signaling sent on dedicated, per-mobile reverse link channels.

Figure 2:
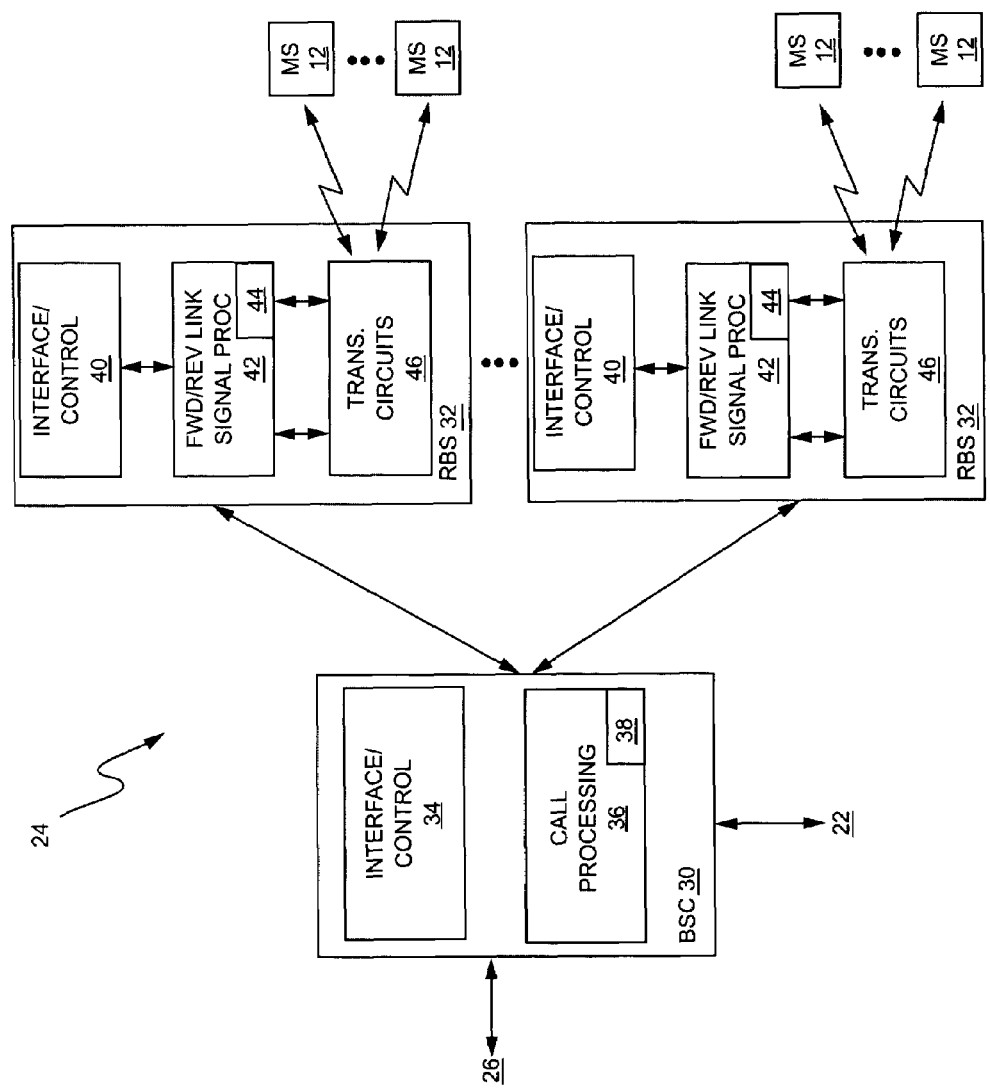
FIG. 2 is a diagram of exemplary base station details.

FIG. 2 illustrates exemplary details for a BS 24 that supports such traffic and control signaling. As illustrated, BS 24 comprises a Base Station Controller (BSC) 30, and one or more Radio Base Stations (RBSs) 32. (Note that in other embodiments the RBS resources may be integrated with the BSC resources.) BSC 30 comprises interface/control circuits 34 and call processing circuits 36, which may include one or more target adjustment circuits 38 in accordance with the present invention. Complementing this arrangement, each RBS 32 includes interface/control circuits 40, forward/reverse link signal processing circuits 42, which may include one or more target adjustment circuits 44 in accordance with the present invention, and transceiver circuits 46 for sending and receiving wireless communication signals to and from the mobile stations 12.

According to the present invention, the RBS 32 transmits power control commands to a mobile station 12 at a first transmit power and transmits non-power control commands, e.g., reverse link rate control commands or retransmit control commands, at a second transmit power. The first and second transmit powers may be the same, or sent at some power that is otherwise related, such as at some known ratio. These commands can be sent to the mobile station using the same forward link channel, on related channels or sub-channels, or sent on different channels.

In any case, the power control commands provide reverse link power control in that they are used to command the mobile station 12 to incrementally adjust its power up and down as needed to maintain targeted received signal qualities at the RBS 32. In one embodiment, RBS 32 provides ongoing transmit power control for the power control commands being transmitted to the mobile station 12 based on receiving channel quality reports, e.g., Channel Quality Indicator (CQI) values, from the mobile station 12. If the reported CQI value, or a metric computed from it, is above or below a target value, RBS 32 adjusts the first transmit power downward or upward, respectively, thus providing a feedback controlled inner power control loop. According to the present invention, the target adjustment circuit 44 of RBS 32 and/or the target adjustment circuit 38 of BSC 30 provides a supplemental, outer loop power control mechanism by adjusting that inner loop control target value upward or downward based on observing whether the mobile station 12 correctly responds to the non-power control commands being transmitted to it. Note, too, that the RBS 32 may adjust the second transmit power along with adjusting the first transmit power, such that observed incorrect responses by the mobile station 12 cause RBS 32 to increase the transmit power used for both the power and non-power control commands and, conversely, observed correct responses may cause RBS 32 to decrease the transmit power used for them.

In another embodiment, RBS 32 maintains ongoing control of the transmit power used for the power (and non-power) control commands based on receiving power control information, e.g., Power Control Bits (PCBs), from the mobile station 12 on the reverse link. In this framework, the mobile station 12 maintains one or more received signal quality targets and streams Up/Down power control commands to the RBS 32 to control the RBS's transmit power for the mobile station 12 substantially at the level needed to maintain the targeted received signal quality.

Thus, mobile station 12 provides the inner loop control of the transmit power used by RBS 32 to send the power and non-power control commands to the mobile station 12. However, according to the present invention, RBS 32 and/or BSC 30 uses the observed responses of the mobile station 12 to the non-power control commands to determine whether the mobile station 12 should adjust its inner loop power control target. For example, RBS 32 can cause the mobile station 12 to raise its inner loop power control target value based on determining that the mobile station 12 responded incorrectly to one or more non-power control commands sent to it. In such embodiments, one or both the BSC's target adjustment circuit 38 and the RBS's target adjustment circuit 44 can be configured with hardware and/or software-based control logic to implement the desired target adjustment functionality.

In the context of CPCCH operations, FIG. 3 provides an exemplary CPCCH illustration, wherein the channel comprises sets of repeating Power Control Groups (PCGs), e.g., sixteen PCGs per 20 ms traffic frame according to current IS-2000 standards. Each PCG comprises a defined number of indexes, i.e., assignable time slots. Different indexes may be used to convey power control commands to different mobile stations 12. For example, index position 1 may be assigned to a first mobile station 12 (MS1), index position 2 may be assigned to a second mobile station 12 (MS2), and so on. In operation, then, RBS 32 would generate PCBs for MS1 and transmit them at the assigned times, e.g., at the repeating first index position, and do likewise for MS2 at index position 2, and so on.

By time multiplexing in this manner, the CPCCH signal may be used to carry different streams of PCBs, i.e., discrete "up" or "down" power control commands, to individual mobile stations 12 in a plurality of mobile stations. The illustrated structure and timing are exemplary and provide sixteen PCGs per 20 ms frame. Assuming that one index per PCG is used to stream PCBs to a given mobile station 12, each mobile station 12 receives PCBs at 800 Hz. Of course, such timing and structure can be varied as needed or desired. For example, in WCDMA implementations, PCBs may be transmitted at up to 1.5 KHz.

Regardless, because the radio conditions differ for each mobile station 12, RBS 32 manages the transmit power of the CPCCH signal on a per-mobile station basis. That is, in an exemplary embodiment, the transmit power of the power control commands sent over the CPCCH is individually for each mobile station 12 being supported by the CPCCH. For example, the CPCCH transmit power for transmissions during index 1 may be controlled according to a target corresponding to MS1, the CPCCH transmit power for transmissions during index 2 may be controlled according to a similar target maintained for MS2, and so on.

FIG. 4 illustrates an exemplary RBS circuit/logic structure for supporting such power control and introduces exemplary target adjustment according to one embodiment of the present invention. With respect to the CPCCH signal transmitted by the RBS 32, the forward/reverse link signal processing circuits 42 of RBS 32 include a target adjustment circuit 44, supporting memory 46, and an inner loop power control circuit 48. The same, or additional, inner loop power control circuits may be included within RBS 32 for controlling the forward link transmit power allocations of mobile-specific dedicated traffic/control channel signals, but one focus is on exemplary control of the CPCCH transmit signal power.

As previously noted, two general approaches apply to controlling the transmit power of the CPCCH signal with respect to a particular mobile station 12. One method implements inner loop power control of the CPCCH signal at the mobile station 12, wherein the mobile station 12 transmits power control commands to the base station on the reverse link, and the RBS 32 controls the CPCCH transmit power to follow those commands. In this context, an exemplary embodiment of the present invention supplements the mobile station's inner loop power control by adding an outer loop correction term that is adjusted based on observing the mobile station's responses to non-power control commands sent at the same transmit power as the power control commands sent on the CPCCH, or sent at some other transmit power that can be related to the CPCCH power in a known manner.

In another embodiment, the mobile station 12 returns channel quality reports to the base station on the reverse link, e.g., it sends Channel Quality Indicators (CQIs) at regular intervals, and the base station allocates CPCCH transmit power for each mobile station 12 as a function of the channel quality information received from each mobile station 12. For example, RBS 32 may set the CPCCH transmit power for each mobile station 12 inversely proportional to that mobile station's reported CQI values, which can be filtered or used as is. In this scenario, the present invention may adjust the proportionality ratio based on observing the mobile station's responses to non-power control commands sent at the same or a related transmit power as the CPCCH power control commands. The inverse proportional operation can be considered as inner loop power control in the CQI reporting case, and the ratio adjustment based on observed responses functions as an outer loop power control.

Thus, control circuit 48 can be configured to control the CPCCH transmit power for a given mobile station 12 responsive to power control commands received on the reverse link from the mobile station 12, or based on comparing one or more CQI values received from the mobile station 12 to a corresponding target. In the first instance, to effect outer loop control based on observing the mobile station's responses to non-power control commands, the RBS 32 can transmit inner loop target adjustment information to the mobile station 12, thereby causing it to raise its inner loop target. In the second instance, RBS 32 can adjust the proportionality ratio it maintains for evaluation of the CQI values reported by the mobile station 12. Of course, it should be understood that some other metric besides CQI could be used, such as signal-to-noise, bit energies, etc.

According to the present invention, both of the above inner loop power control mechanisms are supplemented with a form of outer loop power control wherein the exemplary target adjustment circuit 44 calculates target adjustments for the mobile stations 12 being supported on the CPCCH as a function of observing the mobile stations' deterministic responses to non-power control commands transmitted to them from RBS 32 at the same, or at related, transmit powers as used for transmission of the power control commands sent to those mobile stations 12. For example, assuming that RBS 32 performs inner loop power control on the CPCCH for a particular mobile station 12 based on the CQI values reported by that mobile station 12, it can adjust that inner loop control target based on observing the mobile station's responses to the non-power control commands.

As such, RBS 32 receives CQI values from MS1, and compares the CQI values, or values calculated from them, to a target maintained for MS1. With this method, RBS 32 can provide inner loop CPCCH transmit power control by making incremental up or down adjustments of the CPCCH transmit power used for MS1 responsive to the incoming CQI values, and adjustment circuit 44 can be configured to provide outer loop CPCCH transmit power control by adjusting the target based RBS 32 observing whether MS1 correctly responds to the non-power control commands. Adjustment circuit 44 may be configured to carry out similar target adjustments for a plurality of targets in memory 46 corresponding to a plurality of mobile stations 12.

Since such outer loop target adjustment runs more slowly than the typical rate of inner loop power control, some or all of such processing functionality may be implemented in the target adjustment circuit 38 that optionally is included within the processing circuits of BSC 30. Indeed, in one embodiment, the non-power control commands sent to the mobile stations 12 are retransmit control commands, e.g., "ACK" and "NAK" commands sent by RBS 32 to the mobile stations 12 from which it is receiving reverse link traffic frames.

An example of such an arrangement is found in the developing IS-2000 standards, which include a Hybrid Automatic Repeat Request (H-ARQ) control mechanism for reverse link packet data channel transmissions from the mobile stations. In that approach, RBS 32 provides each such mobile station 12 with per-frame ACK/NAK retransmit control signaling to control whether the mobile station 12 repeats reverse link data frames. With such ACK/NAK retransmit control, the reverse link traffic channel from a given mobile station 12 might be received by multiple RBSs 32, each one of which provides independent ACK/NAK feedback to the mobile station 12. Thus, it is possible that, for a given traffic frame transmitted by it, the mobile station 12 will receive an ACK from one RBS 32 and a NAK from another RBS 32. Therefore, in determining whether the mobile station 12 is correctly responding to ACK/NAK feedback from the network, it may be beneficial for such logic to reside at the BSC-level, because the BSC 30 knows what each RBS 32 sends (ACK or NAK) to a given mobile station 12 for each received traffic frame.

Moreover, in implementations where the mobile stations 12 provide inner loop power control of the CPCCH, outer loop adjustment is based on the base station sending target adjustment information to the mobile stations 12. Thus, it may be beneficial to locate some or all of the logic associated with determining target adjustments at the BSC 30, since it will be involved in generating layer-3 messaging that is used for signaling the mobile stations 12 with the desired adjustment information. Thus, it should be understood that exemplary target adjustment, e.g., outer loop power control for the CPCCH signal, may be implemented in control logic at the RBS level, at the BSC level, or based on cooperating logic implemented across the RBS and BSC. Where the adjustment control is based on the mobile stations' responses to ACK/NAK feedback from the network 10, it may be beneficial to implement at least some of the control logic at the BSC level. Where the adjustment control is based on some other non-power command type, such as reverse link rate control commands, it may be beneficial to implement the control logic at the RBS level. Those skilled in the art will appreciate that such choices may be based on the particular needs, e.g., rate of adjustment, and the BSC-RBS signaling load.

In any case, it should be understood that BSC 30 and RBS 32 each comprise one or more processing circuits, and associated supporting circuitry, e.g., timing, control, and memory/storage elements that may be used to implement the present invention. As such, in one embodiment, the present invention may be embodied in a computer program stored in memory within the BSC 30 and/or RBS 32 for execution by one or more microprocessors, Digital Signal Processors (DSPs), or other processing logic within either or both of those entities. In general, the target adjustment circuit(s) of the present invention may be implemented in hardware, software, or both. It should be understood that all such variations are contemplated within the scope of this invention.

Whether implemented in hardware, software, or some mix thereof, the present invention provides exemplary transmit power control wherein commands of a first type are sent to a given mobile station 12, e.g., PCBs streamed over the CPCCH signal, for which there are no observable, deterministic responses by the mobile station 12, and wherein commands of a second type are sent to the mobile station, e.g., rate and/or retransmit control commands, for which there are observable deterministic responses by the mobile station 12.

The non-power control commands can be sent in differing modulation formats, and at differing transmit powers, so long as the base station can infer the appropriate transmit power adjustment for the CPCCH from observing the mobile stations' responses to the non-power control commands. For example, if reverse link rate control of the mobile stations can tolerate a two percent error and power control can tolerate a four percent error, then the present invention can be configured to make CPCCH power control adjustments every other rate control error. As a result, the rate control commands may not be transmitted at the same power as the CPCCH power commands. In addition, the present invention may consider that exemplary ACK/NAK, power, and rate control channels are not coded.

Such control data may be sent using single bits and/or using ON-OFF symbol keying, both of which have tractable relative performance under different fading channels. Thus, the power and non-power control commands do not need to be of the same modulation type, e.g., one could be Binary Phase Shift Keying (BPSK) and one could be ON/OFF keying. In all cases, however, using the observed responses of the mobile stations to the non-power control commands as a basis for providing outer loop power control of the CPCCH benefits because of the easily observed, logical responses of the mobile stations 12 to the non-power control commands. Such directly observable logical responses, e.g., a given mobile station 12 either does or does not carry out a commanded rate change, or does or does not ACK a transmitted frame, is in contrast to the continuous-value numerical responses of those mobile stations 12 to the reverse link power control commands sent by the RBS 32.

Figure 5:
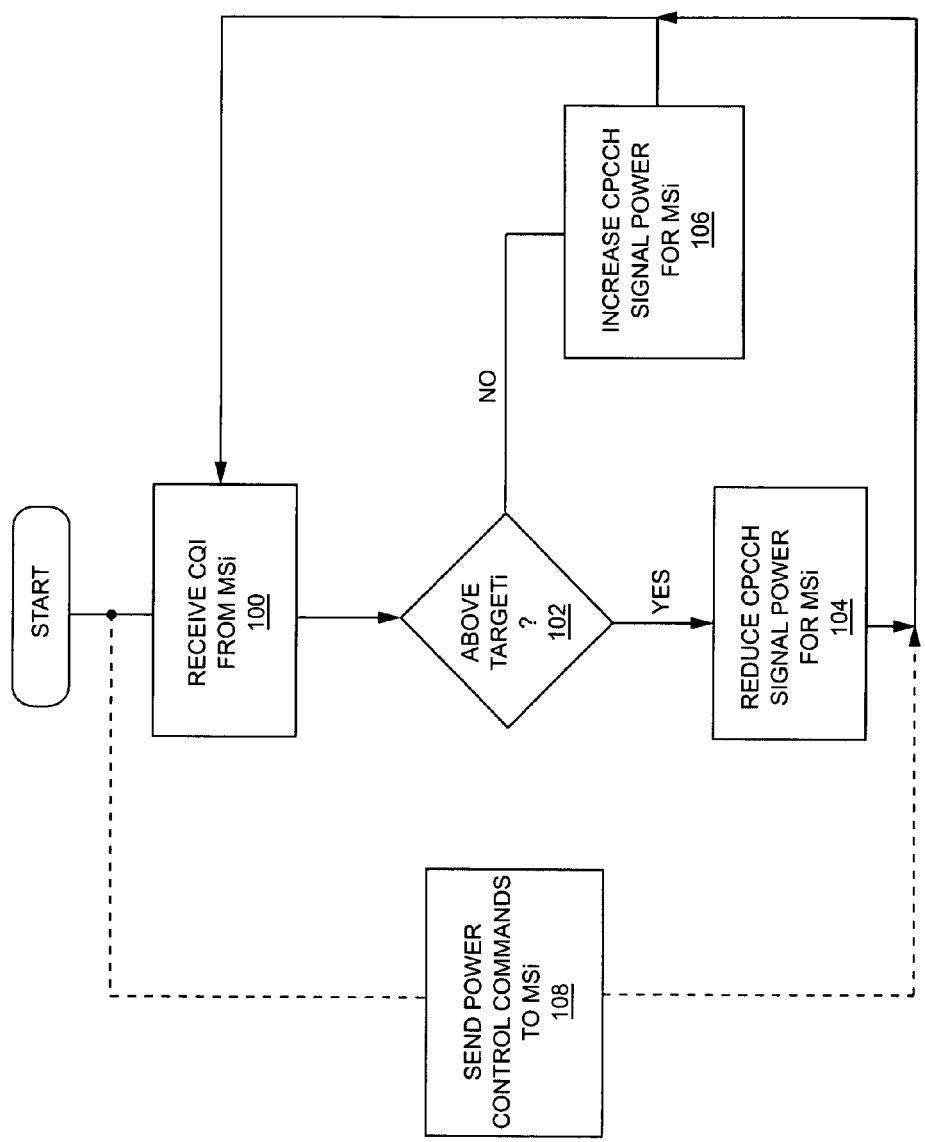
FIG. 5 is a diagram of exemplary processing logic to control CPCCH transmit power.
Figure 6:
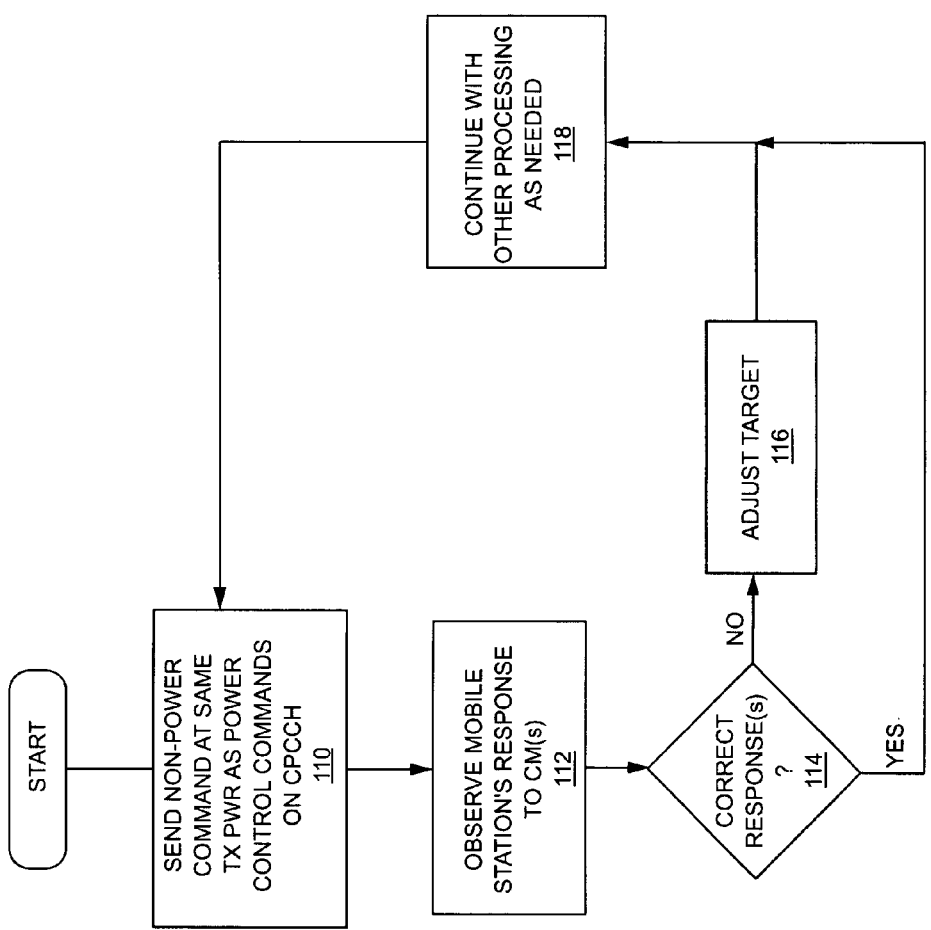
FIG. 6 is a diagram of exemplary processing logic to adjust the target(s) used for CPCCH power control for one or more mobile stations.

FIGS. 5 and 6 illustrate an arrangement in an exemplary embodiment where non-power control commands, e.g., rate control commands and/or retransmit control commands, are sent to mobile stations 12 using sub-channels formed within the CPCCH structure. That is, the CPCCH may be structured such that it carries power control commands at certain times and carries non-power control commands at other times. With the illustrated structure, the CPCCH has one or more sub-channels for sending rate and/or retransmit control commands, although the use of such sub-channels is not a requirement of the present invention.

Broadly, such sub-channels are defined by allocating assigned indexes (slots) from one or more PCGs for transmitting non-power control commands. Thus, one or more indexes from one or more PCGs could be "stolen," or otherwise multiplexed, and used to send rate control, retransmit control, or other types of non-power control commands. For exemplary details of such sub-channels, see the United States patent application entitled "METHOD OF RATE CONTROL," by Young Yoon, which is given Ser. No. 10/800,791 and which is commonly assigned herewith.

By way of non-limiting example, one or more indexes could be taken from a given PCG in every group of sixteen (or eight) PCGs and used to transmit rate control and/or retransmit commands. Indeed, developing IS-2000 standards define a reverse link packet data control channel (R-PDCCH) used by mobile stations along with a reverse link packet data traffic channel (R-PDCH). According to the standards, mobile stations indicate their reverse link transmission rates on a per frame basis using a rate indication carried on the R-PDCCH. With this method, the RBS 32 could send a rate control command to a given mobile station 12, and then observe whether that mobile station 12 correctly responds to the transmitted command based on receiving a correspondingly appropriate rate indication from that mobile station 12.

If the RBS 32 told the mobile station 12 to increase, decrease, or hold its reverse link data rate, it would expect to see the corresponding rate indication from the mobile station indicate a rate increase, decrease, or hold, respectively. Thus, the mobile station 12 provides RBS 32 with observable, deterministic responses to the rate control commands by returning rate indications to the RBS 32 that indicate whether the mobile station 12 properly received the rate control commands transmitted by RBS 32.

Regardless, according to the exemplary logic of FIG. 5 which illustrates RBS operations with respect to a given mobile station 12 (MSi), RBS 32 receives CQI reports, or similar received signal quality information, from MSi on a periodic basis (Step 100). RBS 32 compares the reported CQI against a target value maintained for MSi (Step 102) to determine whether the transmit power of the CPCCH signal should be increased or decreased during the times that signal is assigned to MSi. If the received report indicates that MSi is receiving the CPCCH signal at higher than the target value, the CPCCH signal power is decreased for MSi (Step 104), e.g., decremented by a defined amount. Conversely, if the received report indicates that MSi is receiving the CPCCH signal below the target value, then the CPCCH signal power is increased (Step 106), e.g., incremented by a defined amount. In parallel, or along with, these operations, RBS 32 streams power control commands at assigned times on the CPCCH signal at a transmit power determined by the above inner loop target comparisons (Step 108).

FIG. 6 illustrates exemplary adjustment of the target value for MSi in accordance with one embodiment of the present invention. RBS 32 transmits non-power control commands to MSi, e.g., rate control, re-transmit control, etc., at the same, or at a related, transmit power as used for the PCBs streamed to MSi via the CPCCH signal (Step 110). The RBS 32 may, as explained above, transmit these non-power control commands on one or more sub-channels defined on the CPCCH. Regardless, RBS 32 observes MSi's response to the non-power control commands (Step 112) and determines whether those responses are correct with respect to the transmitted commands (Step 114).

If not, RBS 32 adjusts the target for MSi upward, e.g., by a defined incremental amount (Step 116), and continues with other processing as needed or desired (Step 118). If the response is correct, such other processing may include an (incremental) reduction of the target for MSi. The inner loop power control mechanism governing PCB transmissions to MSi as described in the context of FIG. 5 performs its comparisons against the adjusted target value such that increasing the target tends to increase the transmit power used to send PCBs to MSi, and decreasing the target tends to decrease the PCB transmit power. Of course, such logic might reverse depending on how the target values are defined.

It should be noted that RBS 32 and/or BSC 30 may be configured to carry out these exemplary operations for each one in a plurality of mobile stations 12, based on maintaining and adjusting individual ones in a corresponding plurality of power control targets. Further, it should be noted that the targets adjusted according to exemplary operations of the present invention may be in the form of C/I ratio values, or in the form of received signal strengths (power, bit energy, etc.), or in some other form that relates to the as-received characteristics of the common pilot signal, or other signals transmitted by the RBS 32, at each mobile station 12.

Thus, for the case where a forward ACK channel (F-ACKCH) and a Forward Rate Control Channel (F-RCCH) are implemented as sub-channels of the F-CPCCH, the base station (RBS 32) can allocate a reasonable F-CPCCH/F-ACKCH/F-RCCH power value for the mobile station 12 initially at call setup. RBS 32 can then change the ratio of that power value relative to the CQI reports received from the mobile station 12 and, hence, change the transmit power of the F-CPCCH, F-ACKCH, and F-RCCH in response to observing the mobile station's responses to the ACK/NAK and rate control commands. Such ratio adjustments ensure the desired bit error rate (BER) of the F-ACKCH, F-RCCH, and F-CPCCH under different fading channel conditions.

The power adjustments can be accomplished as follows: if a command error is observed from the mobile station's response, the transmitter increases the ratio of F-CPCCH/F-ACKCH/F-RCCH power to the CQI value by an extra dB. If a command is sent and no erroneous response is observed, the base station can reduce the ratio of F-CPCCH/F-ACKCH/F-RCCH power to the CQI value by $\{x/[1/BER-1]\}$ dB. The step size x can be large initially and gradually be reduced such that the range of errors around the desired optimal power is minimized. Further, if ON/OFF keying is used for F-ACKCH/F-RCCH modulation, the above adjustment also can be applied to the ON/OFF decision threshold in the mobile station 12, i.e., it can be used to adjust the ON/OFF detection threshold. Thus, the base station can measure the mobile station's false detection rate and send network layer-3 messages to reset the mobile station's threshold to reduce the incidence of false detections.

Of course, those skilled in the art will appreciate that the present invention can be applied to a variety of channel and signal types. For example, the base station may transmit one or more "Indicator Control Channels," each comprising one or more sub-channels. In this context, an Indicator Control Channel might carry any combination of sub-channels, such as a power control sub-channel, a rate control sub-channel, and a retransmit control sub-channel, e.g., an ARQ (Automatic Repeat Request) sub-channel. The mobile station's response(s) to one or more types of the non-power control command types sent on such sub-channels can be used in accordance with the present invention to make power control adjustments to the transmit powers of all or selected ones of the power and non-power commands being sent to that mobile station 12 on the various sub-channels.

Further, it should be noted that a base station may transmit two or more types of non-power control commands to a given mobile station 12 in addition to transmitting power control commands to it. It is not necessary that the all of the non-power control commands be sent at the same power and, indeed, different types of non-power control commands can be sent at different transmit powers relative to the power control commands in dependence on, for example, the error tolerance for a particular command type, the modulation format used for the particular command type, etc. Additionally, it should be noted that the base station can base its power control on observing the mobile station's responses to more than one type of non-power control commands. That is, the present invention's power control method can be based on the combination of correct and incorrect responses by the mobile station to multiple types of non-power control commands. Thus, as an example, the base station may make power control adjustments based on whether a given mobile station responds correctly both to rate control and retransmit control commands. Of course, additional or different non-power control commands can be used as the basis for power control adjustments.

In general, then, the present invention provides a method and apparatus for adjusting the power used to transmit power control commands to one or more mobile stations 12 based on transmitting non-power control commands to each mobile station 12 using the same, or a related, transmit power, such that the observed response of the mobile station 12 to the non-power control commands may be used to adjust, or otherwise control, the transmit power used for the power control commands. The non-power control commands may be, for example, rate control and/or retransmit control (ACK/NAK) commands, and such commands may be sent on sub-channels of the CPCCH. However, the present invention is not so limited. Indeed, the present invention is limited only by the following claims and their reasonable equivalents.

What is claimed is:

1. A method of transmit power control at a wireless communication network base station, the method comprising:
   transmitting power control commands to the mobile station at a first transmit power;
   transmitting non-power control commands to the mobile station at a second transmit power; and
   controlling the first transmit power based on determining whether the mobile station correctly responds to the non-power control commands.

2. The method of claim 1, further comprising setting the second transmit power substantially equal to the first transmit power.

3. The method of claim 1, further comprising setting the second transmit power at a known ratio to the first transmit power.

4. The method of claim 1, wherein controlling the first transmit power based on determining whether the mobile station correctly responds to the non-power control commands comprises changing an inner loop power adjustment step size used to incrementally adjust the first transmit power based on determining whether the mobile station correctly responds to the non-power control commands.

5. The method of claim 1, wherein controlling the first transmit power based on determining whether the mobile station correctly responds to the non-power control commands comprises changing an inner loop power control target used to determine whether the first transmit power is too high or too low on a continuing basis.

6. The method of claim 1, wherein controlling the first transmit power based on determining whether the mobile station correctly responds to the non-power control commands comprises:
   setting a target value associated with a desired channel quality at the mobile station;
   receiving periodic channel quality reports from the mobile station;
   increasing the first transmit power if the reported channel quality is below the target value; and
   adjusting the target value to effect an increase in desired channel quality responsive to determining that the mobile station is not correctly responding to the non-power control commands.

7. The method of claim 1, wherein transmitting power control commands to the mobile station at a first transmit power comprises transmitting the power control commands to the mobile station on a Common Power Control Channel (CPCCH) signal.

8. The method of claim 7, wherein controlling the first transmit power based on determining whether the mobile station correctly responds to the non-power control commands comprises changing a power control step size used in inner loop power control of the CPCCH for the mobile station.

9. The method of claim 7, wherein controlling the first transmit power based on determining whether the mobile station correctly responds to the non-power control commands comprises adjusting a power control target used in inner loop power control of the CPCCH for the mobile station.

10. The method of claim 6, wherein adjusting a power control target used in inner loop power control of the CPCCH for the mobile station comprises adjusting a power control target stored at the base station.

11. The method of claim 9, wherein adjusting a power control target used in inner loop power control of the CPCCH for the mobile station comprises transmitting adjustment information to the mobile station such that the mobile station adjusts a power control target stored at the mobile station.

12. The method of claim 1, wherein transmitting non-power control commands to the mobile station at a second transmit power comprises sending reverse link rate control commands to the mobile station at a known power relative to the first transmit power, and wherein controlling the first transmit power based on determining whether the mobile station correctly responds to the non-power control commands comprises determining whether the mobile station responds correctly to the reverse link rate control commands.

13. The method of claim 12, wherein sending reverse link rate control commands to the mobile station comprises sending reverse link rate control commands to the mobile station on a sub-channel of a Common Power Control Channel (CPCCH) that is used to send the power control commands to the mobile station.

14. The method of claim 1, wherein transmitting non-power control commands to the mobile station at a second transmit power comprises sending retransmit control commands to the mobile station at a known power relative to the first transmit power, and wherein controlling the first transmit power based on determining whether the mobile station correctly responds to the non-power control commands comprises determining whether the mobile station responds correctly to the retransmit control commands.

15. The method of claim 14, wherein sending retransmit control commands to the mobile station comprises sending retransmit control commands to the mobile station on a sub-channel of a Common Power Control Channel (CPCCH) used to transmit the power control commands to the mobile station.

16. The method of claim 1, wherein transmitting power control commands to the mobile station at a first transmit power and transmitting non-power control commands to the mobile station at a second transmit power comprises transmitting the power control and non-power control commands to the mobile station using comparable modulation formats such that the reception quality at the mobile station can be related between the first and second transmit powers.

17. The method of claim 16, wherein transmitting the power control and non-power control commands to the mobile station using comparable modulation formats such that the reception quality at the mobile station can be related between the first and second transmit powers comprises sending the power control commands using one of Binary Phase Shift Keying (BPSK) modulation and an ON/OFF Keying (OOK) modulation, and sending the non-power control commands using one of a BPSK modulation and an ON/OFF Keying (OOK) modulation.

18. The method of claim 1, wherein transmitting non-power control commands to the mobile station at a second transmit power comprises transmitting two or more types of non-power control commands to the mobile station at one or more transmit powers related to the first transmit power, and wherein controlling the first transmit power based on determining whether the mobile station correctly responds to the non-power control commands comprises controlling the first transmit power based on the mobile station's responses to the two or more types of non-power control commands.

19. A base station for use in a wireless communication network, the base station comprising:
    transmitter circuits to transmit power control commands to a mobile station at a first transmit power, and to transmit non-power control commands to the mobile station at a second transmit power; and
    one or more processor circuits operatively associated with the transmitter circuits, and configured to control the first transmit power based on determining whether the mobile station correctly responds to the non-power control commands.

20. The base station of claim 19, wherein the base station is configured to set the second transmit power substantially equal to the first transmit power.

21. The base station of claim 19, wherein the base station is configured to set the second transmit power at a known ratio to the first transmit power.

22. The base station of claim 19, wherein the base station is configured to control the first transmit power by changing an inner loop power adjustment step size used to incrementally adjust the first transmit power based on determining whether the mobile station correctly responds to the non-power control commands.

23. The base station of claim 19, wherein the base station is configured to control the first transmit power by changing an inner loop power control target used to determine whether the first transmit power is too high or too low on a continuing basis.

24. The base station of claim 19, wherein the base station is configured to control the first transmit power by:
    setting a target value associated with a desired channel quality at the mobile station;
    receiving periodic channel quality reports from the mobile station;
    increasing the first transmit power if the reported channel quality is below the target value; and
    adjusting the target value to effect an increase in desired channel quality responsive to determining that the mobile station is not correctly responding to the non-power control commands.

25. The base station of claim 19, wherein the base station is configured to transmit the power control commands to the mobile station on a Common Power Control Channel (CPCCH) signal.

26. The base station of claim 25, wherein the base station is configured to control the first transmit power by changing a power control step size used in inner loop power control of the CPCCH for the mobile station.

27. The base station of claim 25, wherein the base station is configured to control the first transmit power by adjusting a power control target used in inner loop power control of the CPCCH for the mobile station.

28. The base station of claim 24, wherein the base station is configured to adjust the power control target used in inner loop power control of the CPCCH for the mobile station comprises by adjusting a power control target stored at the base station.

29. The base station of claim 28, wherein the base station is configured to adjusting the power control target used in inner loop power control of the CPCCH for the mobile station by transmitting adjustment information to the mobile station such that the mobile station adjusts a power control target stored at the mobile station.

30. The base station of claim 19, wherein the base station is configured to transmit the non-power control commands as reverse link rate control commands transmitted to the mobile station at a known power relative to the first transmit power, and wherein the base station controls the first transmit power based on determining whether the mobile station correctly responds to the reverse link rate control commands.

31. The base station of claim 30, wherein the base station is configured to send the reverse link rate control commands to the mobile station on a sub-channel of a Common Power Control Channel (CPCCH) that is used to send the power control commands to the mobile station.

32. The base station of claim 19, wherein the base station is configured to transmit retransmit control commands to the mobile station at a known power relative to the first transmit power as the non-power control commands, and wherein the base station controls the first transmit power based on determining whether the mobile station correctly responds to the retransmit control commands.

33. The base station of claim 32, wherein the base station is configured to send the retransmit control commands to the mobile station on a sub-channel of a Common Power Control Channel (CPCCH) used to transmit the power control commands to the mobile station.

34. The base station of claim 19, wherein the base station is configured to transmit the power control and non-power control commands to the mobile station using comparable modulation formats such that the reception quality at the mobile station can be related between the first and second transmit powers.

35. The base station of claim 34, wherein the base station is configured to transmit the power control commands using one of Binary Phase Shift Keying (BPSK) modulation and an ON/OFF Keying (OOK) modulation, and transmit the non-power control commands using one of a BPSK modulation and an ON/OFF Keying (OOK) modulation.

36. The base station of claim 19, wherein the base station is configured to transmit non-power control commands to the mobile station at a second transmit power as transmitting two or more types of non-power control commands to the mobile station at one or more transmit powers related to the first transmit power, and wherein the base station is configured to control the first transmit power based on determining whether the mobile station correctly responds to the non-power control commands by controlling the first transmit power based on the mobile station's responses to the two or more types of non-power control commands.

37. A method of power control at a wireless communication network base station comprising:
 transmitting first and second types of control commands to a mobile station at the same or related transmit powers, wherein the first type of control commands does not result in observable deterministic responses by the mobile station, and wherein the second type of control commands does result in observable deterministic responses by the mobile station; and
 adjusting the transmit powers used to transmit both types of control commands to the mobile station based on observing whether the mobile station correctly responds to the second type of commands transmitted to it.

38. The method of claim 37, wherein transmitting first and second types of control commands to a mobile station at the same or related transmit powers comprises transmitting power control commands to the mobile station as the first type of commands, and transmitting rate control commands to the mobile station as the second type of command.

39. The method of claim 38, wherein transmitting power control commands to the mobile station as the first type of commands, and transmitting rate control commands to the mobile station as the second type of commands comprises transmitting the power control commands on a common power control channel (CPCCH) signal and transmitting the rate control commands on a rate control sub-channel of the CPCCH.

40. The method of claim 37, wherein transmitting first and second types of control commands to a mobile station at the same or related transmit powers comprises transmitting power control commands to the mobile station on a common power control channel (CPCCH) signal, and transmitting rate control commands to the mobile station on a sub-channel of the CPCCH.

41. The method of claim 40, further wherein adjusting the transmit powers used to transmit both types of commands to the mobile station based on observing whether the mobile station correctly responds to the second type of commands transmitted to it comprises adjusting a target corresponding to the mobile station based on observing whether the mobile station correctly responds to the rate control commands transmitted to it, and controlling the transmit power of the CPCCH for the mobile station based on that target.

42. The method of claim 37, wherein transmitting first and second types of control commands to a mobile station at the same or related transmit powers comprises transmitting power control commands to the mobile station on a common power control channel (CPCCH) signal, and transmitting ACK/NAK retransmit control commands to the mobile station on a sub-channel of the CPCCH.

43. The method of claim 42, further wherein adjusting the transmit powers used to transmit both types of commands to the mobile station based on observing whether the mobile station correctly responds to the second type of commands transmitted to it comprises adjusting a target corresponding to the mobile station based on observing whether the mobile station correctly responds to the ACK/NAK retransmit control commands transmitted to it, and controlling the transmit power of the CPCCH for the mobile station based on that target.

44. The method of claim 43, further comprising, where the mobile station is receiving ACK/NAK retransmit control commands from one or more additional base stations, determining what the correct ACK/NAK retransmit control command response is for a given command interval based on the ACK/NAK retransmit control commands sent from all such base stations.

45. A wireless communication network base station comprising:
 transceiver circuits configured to transmit signals to a plurality of mobile stations, including a common power control channel (CPCCH) signal, and to receive signals from the mobile stations; and
 processing logic operatively associated with the transceiver circuits and configured to transmit power control commands on the CPCCH signal to the mobile stations and to control a transmit power of the CPCCH signal for each mobile station based on a target corresponding to the mobile station, and further configured to transmit non-power control commands to the mobile stations via the CPCCH at the same or related transmit powers as used to transmit the power control commands to the mobile stations;
 said processing logic including a target adjustment circuit configured to adjust the targets for the mobile stations based on observing their responses to the non-power control commands transmitted to them.

46. The base station of claim 45, wherein the base station comprises a radio base station (RBS) and an associated base station controller (BSC), and wherein the target adjustment circuit comprises a BSC-based logic circuit.

47. The base station of claim 45, wherein the base station comprises a radio base station (RBS) and an associated base station controller (BSC), and wherein the target adjustment circuit comprises a RBS-based logic circuit.

48. The base station of claim 45, wherein the non-power control commands comprise reverse link rate control commands, and wherein the base station is configured to control a reverse link data rate of the mobile station based on transmitting reverse link rate control commands to it.

49. The base station of claim 48, wherein the target adjustment circuit is configured to adjust the target for the mobile station by observing whether the mobile station correctly responds to the reverse link rate control commands transmitted to it by the base station.

50. The base station of claim 49, wherein the target adjustment circuit is configured to raise the target if the mobile station responds incorrectly to the power control commands.

51. The base station of claim 45, wherein the base station is configured to transmit ACK/NAK retransmit control commands to the mobile station as the non-power control commands, and wherein the base station further is configured to generate the ACK/NAK commands responsive to receiving reverse link traffic from the mobile station.

52. The base station of claim 51, wherein the target adjustment circuit is configured to adjust the target for the mobile station based on observing whether the mobile station correctly responds to the ACK/NAK retransmit control commands transmitted to it.

53. The base station of claim 52, wherein the target adjustment circuit is configured to adjust the target for the mobile station based on observing whether it correctly responds to the ACK/NAK retransmit control commands transmitted to it by raising the target if the mobile station fails to respond correctly to the ACK/NAK retransmit control commands.

54. The base station of claim 45, wherein the base station is configured to transmit the power control commands to the mobile station on the CPCCH signal at assigned times and controls the transmit power of the CPCCH signal during those assigned times based on the target corresponding to the mobile station.

55. The base station of claim 54, wherein the base station is configured to transmit the non-power control commands to the mobile station via the CPCCH at the same or related transmit powers as used to transmit the power control commands to the mobile station by transmitting rate control or retransmit control commands to the mobile station at additional assigned times on the CPCCH signal, and to control the transmit power of the CPCCH signal during those additional assigned times based on the target corresponding to the mobile station.

56. The base station of claim 45, wherein the base station is configured to transmit reverse link rate control commands as the non-power control commands.

57. The base station of claim 56, wherein the target adjustment circuit is configured to adjust the target for the mobile station based on observing its responses to the non-power control commands transmitted to it by adjusting the target for the mobile station based on observing whether the mobile station correctly responds to the reverse link rate control commands transmitted to it.

58. The base station of claim 57, wherein the base station is configured to observe whether the mobile station correctly responds to the reverse link rate control commands transmitted to it by receiving reverse link rate indications from the mobile station and determining whether the mobile station correctly responds to the reverse link rate control commands based on the received reverse link rate indications.

59. The base station of claim 45, wherein the target for each mobile station comprises a ratio of the transmit power used to transmit on the CPCCH to the mobile station and a corresponding received signal quality reported by the mobile station, and wherein the target adjustment circuit adjusts the target by adjusting the ratio.

60. The base station of claim 59, wherein the target adjustment circuit is configured to increase the ratio responsive to observing an erroneous response at the mobile station.

61. The base station of claim 59, wherein the target adjustment circuit is configured to increase the ratio to effect a desired dB increase in the transmit power of the CPCCH for the mobile station responsive to observing an erroneous response at the mobile station.

62. The base station of claim 59, wherein the target adjustment circuit is configured to decrease the ratio to effect a desired dB decrease in the transmit power of the CPCCH for the mobile station if the mobile station responds correctly to one or more non-power control commands.

63. The base station of claim 45, wherein the base station is configured to transmit adjustment information to one or more of the mobile stations based on observing their responses to the non-power control commands to enable the mobile stations to adjust a detection threshold used by each of the one or more mobile stations to detect the non-power control commands.

* * * * *

UNITED STATES PATENT AND TRADEMARK OFFICE
CERTIFICATE OF CORRECTION

| | |
|---|---|
| PATENT NO. | : 7,346,314 B2 |
| APPLICATION NO. | : 10/768560 |
| DATED | : March 18, 2008 |
| INVENTOR(S) | : Tsai et al. |

It is certified that error appears in the above-identified patent and that said Letters Patent is hereby corrected as shown below:

On the Title Page, item (75), under "Inventors", in Column 1, Lines 2-3, delete "Anthony C. K. Soong, Superior, CA (US)" and insert -- Anthony C. K. Soong, Superior, CO (US) --, therefor.

In Column 6, Line 29, delete "(CQls)" and insert -- (CQIs) --, therefor.

Signed and Sealed this

Seventh Day of October, 2008

JON W. DUDAS
*Director of the United States Patent and Trademark Office*